United States Patent
Ben Porath et al.

(10) Patent No.: US 10,380,350 B1
(45) Date of Patent: Aug. 13, 2019

(54) EFFICIENT AND COMPREHENSIVE SOURCE CODE FUZZING

(71) Applicant: CyberArk Software Ltd., Petach-Tikva (IL)

(72) Inventors: Ze'ev Ben Porath, Petach-Tikva (IL); Kasif Dekel, Petach-Tikva (IL)

(73) Assignee: CYBERARK SOFTWARE LTD., Petach-Tikva (IL)

(*) Notice: Subject to any disclaimer, the term of this patent is extended or adjusted under 35 U.S.C. 154(b) by 0 days.

(21) Appl. No.: 16/248,272

(22) Filed: Jan. 15, 2019

(51) Int. Cl.
| | | |
|---|---|---|
| *G06F 9/44* | (2018.01) | |
| *G06F 21/57* | (2013.01) | |
| *G06F 11/36* | (2006.01) | |
| *G06F 21/56* | (2013.01) | |
| *G06N 20/00* | (2019.01) | |
| *H04L 29/06* | (2006.01) | |
| *G06N 7/02* | (2006.01) | |

(52) U.S. Cl.
CPC ........ *G06F 21/577* (2013.01); *G06F 11/3684* (2013.01); *G06F 11/3692* (2013.01); *G06F 21/56* (2013.01); *G06N 7/02* (2013.01); *G06N 20/00* (2019.01); *H04L 63/1433* (2013.01)

(58) Field of Classification Search
CPC ............ H04L 63/1433; G06F 11/3692; G06F 11/3684; G06F 21/56; G06F 21/577; G06N 20/00; G06N 7/02
See application file for complete search history.

(56) References Cited

U.S. PATENT DOCUMENTS

2019/0109872 A1* 4/2019 Dhakshinamoorthy ............... H04L 63/1433

* cited by examiner

*Primary Examiner* — Tuan A Vu
(74) *Attorney, Agent, or Firm* — Finnegan, Henderson, Farabow, Garrett & Dunner LLP

(57) ABSTRACT

Disclosed embodiments relate to exposing potential vulnerabilities in software programs. Techniques include referencing a software vulnerability assessment program, and modifying source code of a tested software program with native language commands. Techniques also include testing the modified software program, analyzing tracked executed code sections of output data to identify one or more current barriers in the tested software program, generating new input data for the tested software program configured to cross one or more current barriers, and merging the new generated input data with a dataset that is being tested by the software vulnerability assessment program.

20 Claims, 7 Drawing Sheets

EFFICIENT AND COMPREHENSIVE SOURCE CODE FUZZING

BACKGROUND

Fuzzing is a method of using random or semi-random input modifications to expose errors and vulnerabilities in software programs. Fuzzing, or fuzz testing, involves feeding invalid or random data into a computer program and monitoring the program for exceptions, such as crashes, failing built-in code assertions, or potential memory leaks.

Although fuzzing can be effective in identifying defects in software, there are several drawbacks. For example, fuzzing is inherently slow and computationally intensive. Because fuzzing is based in a large part on random modifications to input data, fuzz testing may take a long time to discover all the accessible software paths and determine input data that will cause the software program to crash or result in a hang.

Additionally, many parts of a program's source code are typically not accessible by the fuzzer at all. For example, entry conditions to certain code sections may be too complex to be discovered randomly by the fuzzer. Other code sections may require an external error or event condition independent of the input generated by the fuzzer. In addition, the input samples generated by the fuzzer may not be comprehensive enough. The result is that the fuzzer may only be able to access a relatively small percentage of the program source code. Consequently, many errors and vulnerabilities in software are left undetected.

Thus, there is a need for technological solutions for testing software that are robust and efficient. Advantageously, such solutions should not have the same limitations as existing fuzzing tools. Such solutions should not be limited by barriers in software, but instead should be able to bypass or overcome such barriers to continue the analysis. In addition, such solutions should be quicker and more efficient than existing conventional fuzzing tools.

SUMMARY

The disclosed embodiments describe non-transitory computer readable media and methods for exposing potential vulnerabilities in software programs. For example, in an exemplary embodiment, there may be a non-transitory computer readable medium including instructions that, when executed by at least one processor, cause the at least one processor to perform operations for exposing potential vulnerabilities in software programs. The operations may comprise referencing a software vulnerability assessment program; modifying the source code of the tested software program with a native language command, without changing the functional behavior of the tested software program, in order to track executed code sections of the tested software program, and generate output data with the tracked executed code sections; executing the software vulnerability assessment program to test the modified tested software program; analyzing the tracked executed code sections of the output data, generated during the execution of vulnerability assessment program, to identify one or more current barriers in the tested software program, wherein the one or more current barriers comprise an executed code section of the tested software program and an unexecuted code section of the tested software program; generating new input data for the tested software program configured to cross the one or more current barriers; and merging the new generated input data with a dataset that is being tested by the software vulnerability assessment program. The software vulnerability assessment program may be configured to execute a tested software program, and apply random changes to input data for the tested software program.

According to a disclosed embodiment, generating the new input data comprises determining a set of values that satisfy the one or more current barriers to access the unexecuted code section.

According to a disclosed embodiment, determining the set of values comprises at least one of: modifying the new input data to satisfy the one or more current barrier conditions; activating command line arguments in the tested software program; simulating external operating system events affecting the tested software program; or emulating external inputs to the tested software program.

According to a disclosed embodiment, the operations further comprise analyzing the source code of the tested software program to identify the one or more current barriers.

According to a disclosed embodiment, the operations further comprise executing the tested software program such that the software vulnerability assessment program uses the merged new generated input data to access the previously unexecuted code section.

According to a disclosed embodiment, generating new input data further comprises determining an offset location for each value in the set of values, the offset location being associated with a position in a file containing the input data.

According to a disclosed embodiment, the one or more current barriers have a barrier condition that comprises a programming language-specific condition statement.

According to a disclosed embodiment, generating the new input data comprises generating one or more initial values, wherein an initial value is configured to satisfy the one or more current barriers after being acted upon by the source code of the tested software program.

According to another disclosed embodiment, there may be a non-transitory computer readable medium including instructions that, when executed by at least one processor, cause the at least one processor to perform operations for exposing potential vulnerabilities in software programs. The operations may comprise: analyzing source code of a tested software program using language processing; identifying one or more current barriers in the tested software program, each barrier having a start condition and an end condition; and inserting, into the source code, a command before the start condition and the end condition of each of the one or more barriers.

According to a disclosed embodiment, at least one of the start condition or the end condition comprises one or more logically conjunct clauses.

According to a disclosed embodiment, the operations further comprise expanding the one or more logically conjunct clauses and inserting an execution tracking command associated with each clause.

According to a disclosed embodiment, the operations further comprise identifying one or more variables of the source code.

According to a disclosed embodiment, the one or more variables comprise a variable that is assigned a value received from an external source.

According to a disclosed embodiment, the tested software program comprises one or more function wrappers.

According to a disclosed embodiment, the operations further comprise: analyzing the one or more wrappers; identifying at least one header; inserting the wrapper code into the source code of the tested software program; and replacing all references to the wrapped function by reference to the wrapper function.

According to a disclosed embodiment, the command is configured to conditionally provide input indicative of an external event based on inserted input data to the tested software program.

According to another disclosed embodiment, a computer-implemented method may be implemented for exposing potential vulnerabilities in software programs. The method may comprise referencing a software vulnerability assessment program; modifying the source code of the tested software program with a native language command, without changing the functional behavior of the tested software program, in order to track executed code sections of the tested software program, and generate output data with the tracked executed code sections; executing the software vulnerability assessment program to test the modified software program; analyzing the tracked executed code sections of the output data, generated during the execution of vulnerability assessment program, to identify one or more current barriers in the tested software program, wherein the one or more current barriers comprise an executed code section of the tested software program and an unexecuted code section of the tested software program; generating new input data for the tested software program configured to cross the one or more current barriers; and merging the new generated input data with a dataset that is being tested by the software vulnerability assessment program. The software vulnerability assessment program may be configured to: execute a tested software program; and apply random changes to input data for the tested software program.

According to a disclosed embodiment, generating the new input data comprises determining a set of values that satisfy the one or more current barriers to access the unexecuted code section.

According to a disclosed embodiment, determining the set of values comprises at least one of: activating command line arguments in the tested software program, simulating external operating system events affecting the tested software program, or emulating external inputs to the tested software program.

According to a disclosed embodiment, the method further comprises analyzing the source code of the tested software program to identify the one or more current barriers.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
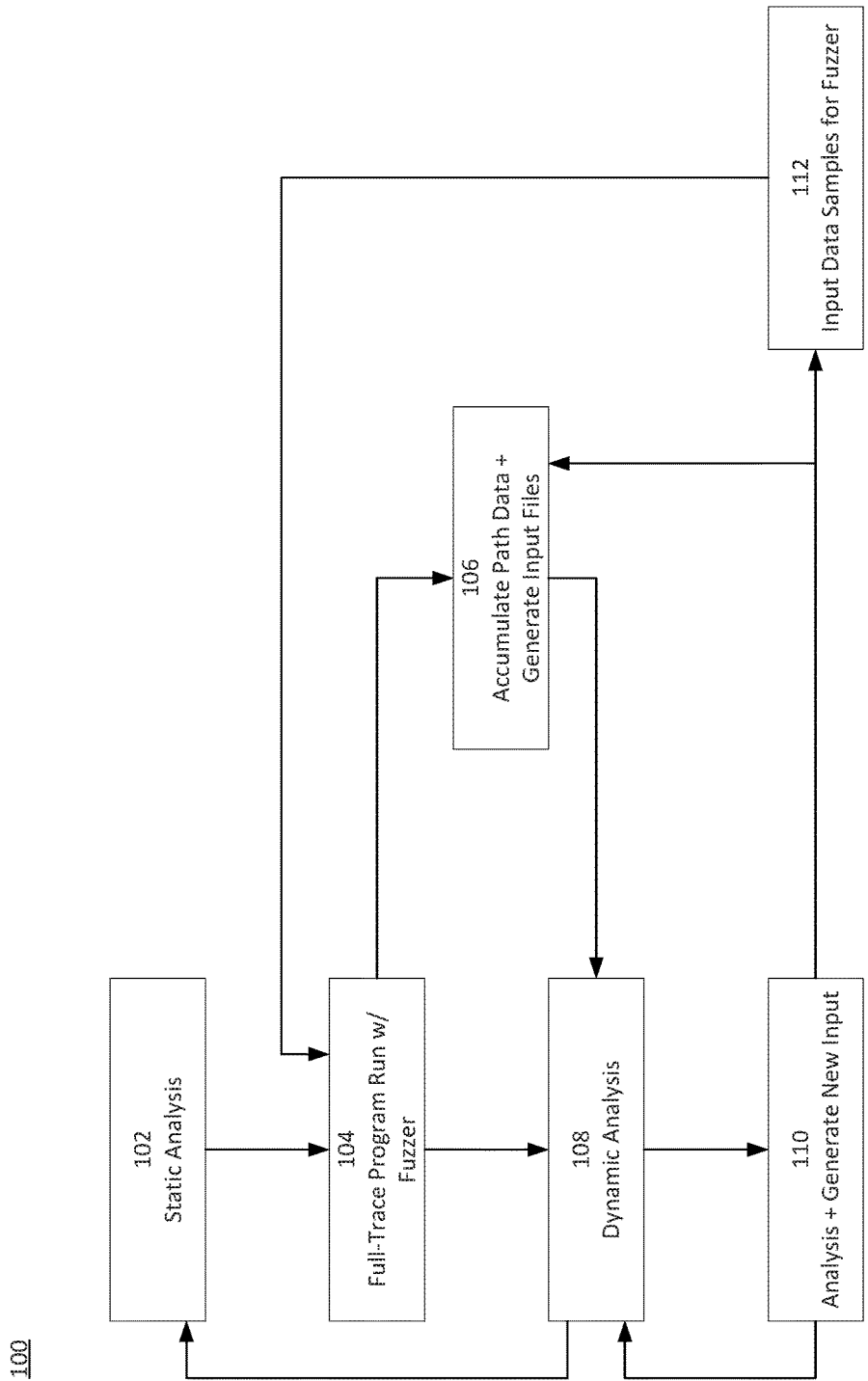
FIG. 1 is a block diagram depicting an example process for instrumenting and analyzing source code in accordance with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

Fuzzing or fuzz testing is an automated software testing technique that involves providing invalid, unexpected, or random data as inputs to a computer program. The program being tested is then monitored for exceptions such as crashes, failing built-in code assertions, or potential memory leaks. As used herein, the term "fuzzer" or software vulnerability assessment program refers to a program configured to execute fuzz testing by generating random inputs that satisfy conditions within the code of a tested software program, thereby accessing one or more code sections of the software source code.

While fuzz testing can be helpful in exposing vulnerabilities and bugs within a tested program, it is inherently slow and may not access each and every code section of the tested program. Because fuzzing is based largely on random modifications to the input data, the fuzzer may take a long time to "discover" all the accessible software paths or to find input data that will cause the tested program to crash or hang. For example, to access certain code sections, the fuzzer needs to generate input to satisfy one or more barrier conditions (e.g., an "if," "else if," or "for" condition, a "while" condition, etc.). The fuzzer may require numerous iterations of generated input data to satisfy each barrier condition in the source code of the tested program. The result is an inefficient process requiring significant computational and resource requirements.

In addition, some parts of the code may not be accessible to the fuzzer at all, resulting in blind spots in the analysis. For example, entry conditions required to satisfy barrier conditions may be too complex to be discovered randomly.

Other barrier conditions may require an external error or an event condition, which is independent from the input. Additionally, input samples may not be comprehensive enough to access all code sections. For example, a barrier condition of a code section may require a certain combination of command line modifiers.

Different methods have been developed to minimize the limitations of fuzz testing. However, these methods also suffer from several drawbacks. Symbolic execution (SE) is one method of improving fuzz testing. SE provides a means of analyzing a program to determine what inputs cause each part of a program to execute. An SE tool may be configured to execute the binary code of the tested program with an interpreter by assuming symbolic values for inputs. For each branch of the executed code, the SE tool may be configured to compute functions of the symbolic values that satisfy all the barrier conditions up to the current point in the source code of the tested program and generate all possible paths in the source code from the current point.

However, SE suffers from similar problems as those arising in fuzz testing. For example, although SE is configured to solve barrier conditions faster than a fuzzer, SE is not scalable to large programs. Additionally, by running a binary code, an SE tool is unable to generate or modify inputs that arise from external events and external errors.

The various implementations described herein overcome the above limitations of fuzz testing and testing using an SE tool. By analyzing a tested program at the source code level, and applying source-level instrumentation tools (e.g., executed paths tracing, debug prints, emulation of errors, etc.), embodiments of the instrumentation techniques described herein may help a fuzzer bypass barriers that it fails to overcome by itself. This approach has practical advantages over the SE approach as it is more easily implemented because the tested program may be more readily understood at the source code level than at a binary code level. Additionally, disclosed embodiments of an instrumentation tool may generate "external" output cases that an SE tool working with binary code cannot easily perform.

Disclosed embodiments of an instrumentation tool may modify the source code of a tested program without changing or effecting the functionality of the tested program. Additionally, embodiments of the instrumentation tool may cause minimal change to the performance of the tested program. As described herein, embodiments of an instrumentation tool may identify barrier points of a fuzzer's testing. For example, the instrumentation tool may identify and display barrier conditions that the input generated by the fuzzer has not crossed, which may be indicative of a code section that has not been accessed by the fuzzer. Additionally, the instrumentation tool may generate input data to cross these barriers and may feed the generated input data to the fuzzer. This cycle may be repeated as the generated input data enables the fuzzer to access more and more code sections.

The instrumentation tool may provide functionality that supports the operations performed by the fuzzer. For example, the instrumentation tool may improve the fuzzer's barrier crashing (i.e., barrier crossing) capabilities through data input tracing, command line argument modification, command line generation, function wrapping, and environment event generation. The instrumentation tool may also enhance the fuzzing capability of the fuzzer through atomic comparison function simplification, environment event generation (e.g., simulating an I/O event such as an error opening a file), and catching non-crashing errors. For example, the instrumentation tool may replace one or more atomic string comparison operations (e.g., memcmp, strcmp, etc.) with sequential implementation that the fuzzer may instrument. In another example, the instrumentation tool may initiate raising an exception to cause the "catch" bracket to occur.

As will be discussed in further detail below, the instrumentation tool may insert wrapper code and/or synthetic headers into the source code of the tested program, which enable the fuzzer to generate and modify input data generated as a result of external events, errors, or command line arguments. Conventional fuzzers cannot generate this type of input data.

In some embodiments, the instrumentation tool may include two modes or phases, which may be separate programs or parts of a single program: a static analysis mode; and a dynamic analysis mode. The static analysis mode may identify one or more source level consecutive code sections in the tested program and trace the sections executed when the fuzzer runs the tested program. As used herein, a consecutive code section is a section that will execute fully each time the tested program is executed. As used herein, a potential barrier is a conditional expression that may prevent the tested program from executing a consecutive code section. A potential barrier may be, for example, an "if" condition, "else if", termination condition of a "for" loop, a "while" condition, a "switch" case, etc.

In some embodiments, the static-analysis program identifies all consecutive code sections and inserts commands (e.g., print statements, output statements, etc.), or trace points, to trace passage through these code sections during execution of the tested program. In some embodiments, each trace point is uniquely identified, for example, with a seq_id, line number, or the like. The static analysis program may identify potential barriers and record them. Each potential barrier may be identified by the trace point preceding the barrier condition (i.e., a "from-point") and the trace point at the start of the code section beyond the barrier condition (i.e., a "to-point"). In some embodiments, the static analysis program may insert trace points configured to output the executed module name, the executed function name, a sequence number associated with the from-point, a sequence number associated with the to-point, and/or the source conde content of the barrier condition.

In some embodiments, the dynamic analysis program may work continuously alongside a fuzzer. For example, the fuzzer may execute the tested program continuously and generate output files when the tested program reaches new trace points. The output files may include, for example, path coverage data including one or more trace points indicative of a particular path through the source code of the executed program. The fuzzer may be prevented from crossing one or more potential barriers in the source code, for example, due to one or more of the limitations described above. The dynamic analysis program may be configured to detect when no new output files have been generated by the fuzzer for a predetermined period of time. After the predetermined period of time has elapsed with no new output files having been generated, the dynamic analysis program may analyze the output files generated by the fuzzer up to that point. Based on this analysis, the dynamic analysis program may identify one or more barriers that the fuzzer has not crossed, indicating one or more code sections that have not been accessed by the fuzzer. The dynamic analysis program may generate input data files including input data to cross the identified barriers. These input data files may then be added to the fuzzer's queue folder which includes files of input data generated by the fuzzer. The above process is then repeated as the fuzzer continuously executes the tested program with input files from its queue.

FIG. 1 is a flow chart of an exemplary process 100 for implementing an instrumentation tool consistent with disclosed embodiments. At step 102, the instrumentation tool may perform static analysis of a tested program to generate instrumented source code by identifying barriers in the source code of the tested program and inserting trace point commands in the source code. As discussed above, a barrier may be a conditional expression in code that might prevent the program from executing a consecutive code section (e.g., an "if" condition, "else if" condition, termination condition of a "for" loop, a "while" condition, a "switch" case, etc.). In some embodiments, each trace point may be uniquely identified (e.g., with a numerical identifier or some other type of identifier). For example, each barrier may be identified by the trace point preceding the barrier condition (e.g., a "from-point") and the trace point at the start of the potentially-not-executed code section (e.g., a "to-point").

At step 104, the instrumented source code may be executed with input data generated by the fuzzer. In some embodiments, the instrumented code may be instructed to log each pass through a trace point to a full-trace file. The full-trace file may be used to generate path data. In some embodiments, the full-trace file may be used by the dynamic analysis program to analyze actual program execution order. This analysis may be used to trace the input process of the tested program, as well as in the logic for activating various external events.

In some embodiments, the instrumented source code may include commands to record various run-time values. For example, the static analysis program may insert such commands into the source code after a raw input command to report the file location of the raw input and the amount of raw input data received. The static analysis program may also insert a command after data from raw-input fields is assigned to other types of input fields and/or before potential barrier conditions to record values of variables/expressions in the conditional clause of the barrier. These values may be used as an aid in solving the barrier condition.

In some embodiments, the dynamic analysis program may control which logging operations will take place via an external control file. For instance, the external control file may instruct the instrumented code to execute the run-time and full-trace commands, for example, when executing a full-trace run of the tested program with the fuzzer, e.g., step 104.

At step 106, the full-trace data may be accumulated to determine path coverage information indicative of which paths have been executed through the source code. The full trace data may also be used by the instrumentation tool to generate input files based on the potential barriers identified by the static analysis program at step 102.

At step 108, the dynamic analysis program may determine new input fields to overcome barriers identified during the full trace run of the instrumented code at step 104. In some embodiments, step 108 may occur when no data is accumulated at step 106 for a predetermined period of time. At step 110, the dynamic analysis program may generate input data based on the input fields identified in step 108. For example, at step 108, the dynamic analysis program may identify a barrier to execution of a code section including a conditional statement based on a first variable. The dynamic analysis program may use the full trace information accumulated at step 106 to trace the input originating the first variable. At step 110, the dynamic analysis program may determine an input value configured to result in a value of the first variable that will satisfy the barrier condition.

In some embodiments, the dynamic analysis program may identify new input field variables based on the trace output generated by executing the instrumented code with the fuzzer. In order to solve the barrier conditions containing these input field variables, the dynamic analysis program may require additional run-time debug logging. In some embodiments, the static analysis program may re-execute the instrumentation tool to insert new logging commands into the tested program source code to trace the newly identified input field variables. In some embodiments, this process may occur each time the dynamic analysis program identifies one or more new input field variables. In some embodiments, the newly generated instrumented code is used for additional, or deeper, dynamic analysis and may not be used when executing the tested software program with the fuzzer.

At step 112, the generated input data may be included in an input data file that is added to the queue of the fuzzer. The generated input data may also be used at steps 108 and 110 to identify and solve barrier conditions during subsequent runs through the instrumented source code. In some embodiments, steps 104-112 may occur simultaneously or in tandem.

Figure 2:
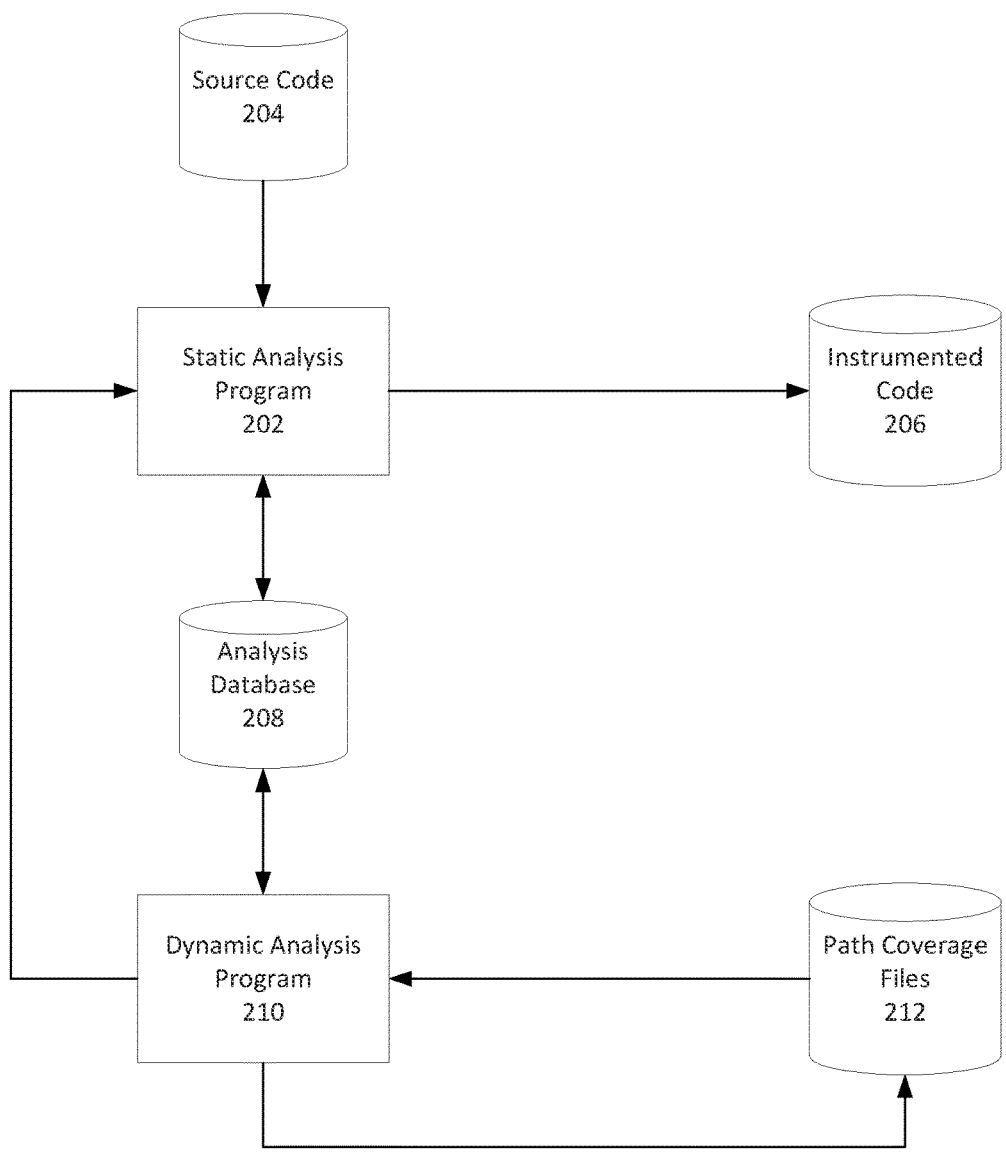
FIG. 2 is another block diagram depicting an example process for instrumenting and analyzing source code in accordance with disclosed embodiments.

FIG. 2 is a flowchart of an exemplary process 200 for implementing an instrumentation tool consistent with disclosed embodiments. In process 200, static analysis program 202 may receive source code 204 of a tested program. Source code 204 may be received by the instrumentation tool from, for example, a database or code repository, from a network-accessible server, or from any other network component.

Static analysis program 202 may generate and store an instrumented version 206 of the source code 204. For example, the instrumented code 206 may include output commands such as trace points, as discussed above. In some embodiments, static analysis program 202 may generate a full-trace version of the instrumented code configured to output full trace information and a version of the instrumented code configured to output trace points and information associated with potential barriers. In other embodiments, the execution of full-trace commands and/or run-time logs may be controlled by an external file.

In some embodiments, static analysis program 202 may output potential barrier information (e.g., barrier location, barrier identifier, etc.) to an analysis database 208. For example, analysis database 208 may store trace information, input information, and/or generated input values determined by static analysis program 202 and dynamic analysis program 210. Information stored in analysis database 208 may be used by dynamic analysis program 210 to solve or bypass one or more barrier conditions. Dynamic analysis program 208 may also generate path coverage files 212 based on the trace information output as a result of executing the instrumented code 206. The path coverage files 212 may include information indicating which code sections of the tested program have been accessed by the fuzzer.

Figure 3:
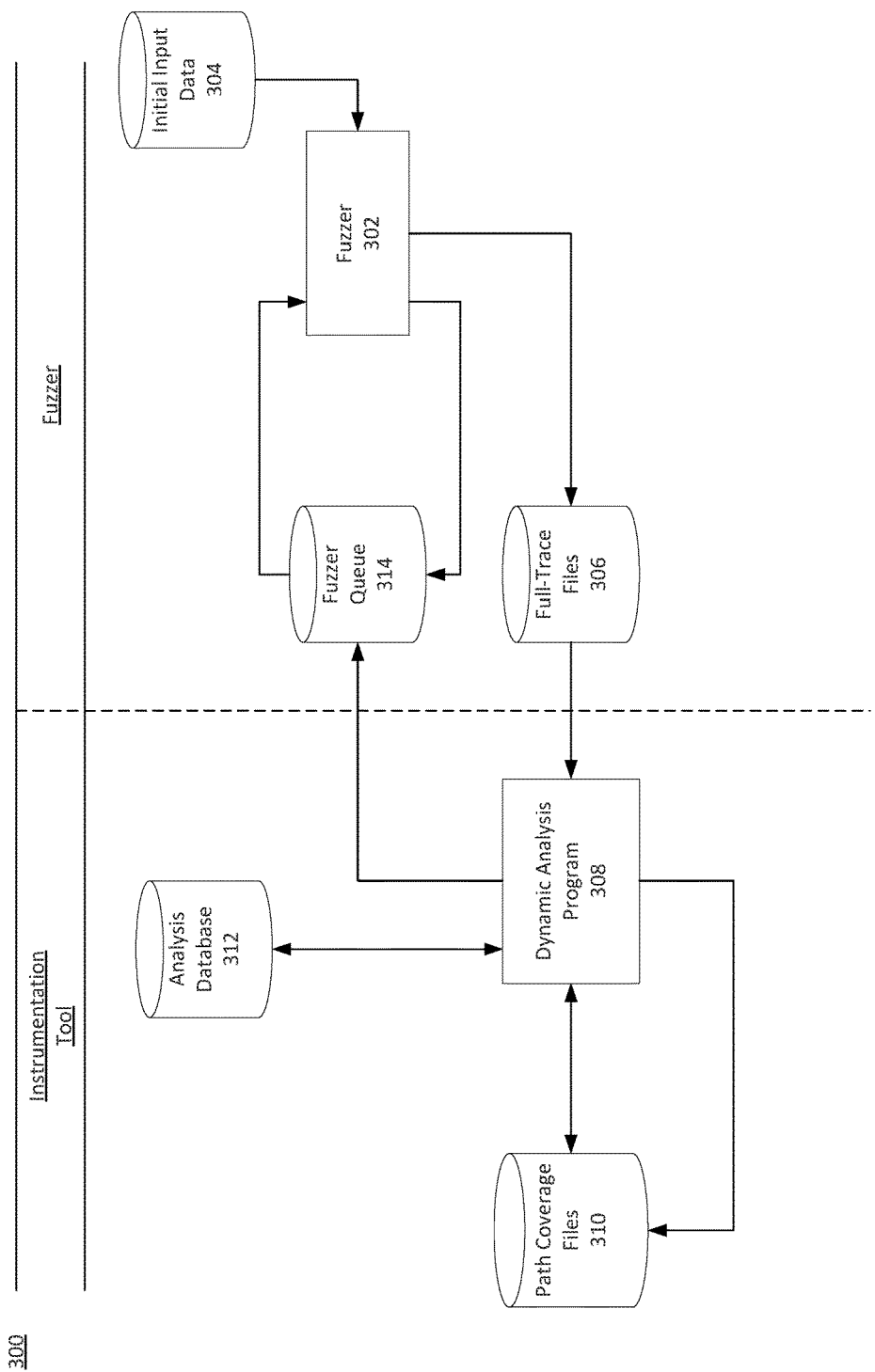
FIG. 3 is a block diagram depicting an example dynamic analysis process in accordance with disclosed embodiments.

FIG. 3 is a flowchart of a process 300 for implementing an instrumentation tool (e.g., the instrumentation tool discussed with reference to FIG. 2) with a fuzzer, consistent with disclosed embodiments. Process 300 may, for example, provide an implementation of the flow described with reference to FIG. 1.

In some embodiments, the fuzzer 302 may receive initial input data 304 and execute an instrumented version of the tested program's source code (e.g., instrumented code 206)

using the initial input data 304. As the fuzzer 302 executes the instrumented source code, the commands to output trace information inserted into the code by the static analysis program (e.g., program 202, as discussed above) cause path coverage data to be output to full-trace (or, in some embodiments, partial-trace) files 306.

Dynamic analysis program 308, which may be the same as dynamic analysis program 210, may receive the full-trace (or partial-trace) files 306 and identify one or more barriers that the initial input data 304 did not cross. Dynamic analysis component 308 may use information from full-trace files 306, path coverage files 308 (e.g., path coverage files 212), and analysis database 312 (e.g., analysis database 208) to generate input configured to cross the one or more barriers. The generated input data file may be added to the fuzzer queue 314.

Figure 4:
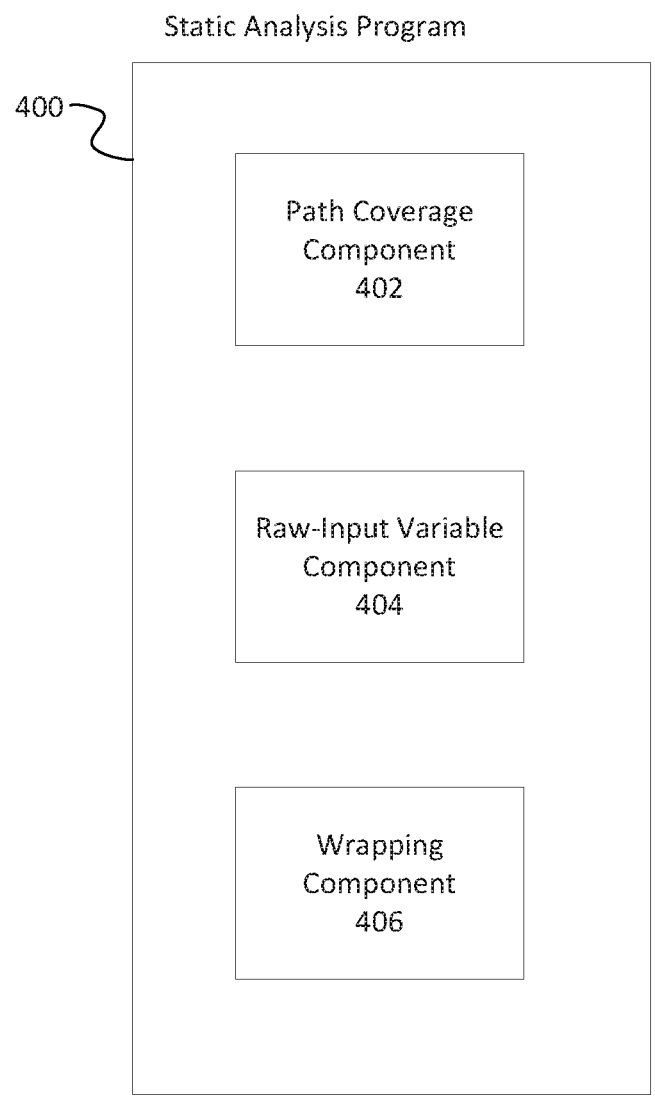
FIG. 4 is a block diagram depicting the components of a static analysis program in accordance with disclosed embodiments.

FIG. 4 is a block diagram of an exemplary static analysis program 400 consistent with disclosed embodiments. Static analysis program 400 may include a path coverage component 402, a raw-input variable component 404, and a wrapping component 406, as well as potentially other components. Static analysis program 400 may analyze the source code and generate an instrumented version of the source code. The instrumented source code may include, for example, one or more output commands such that when the instrumented code is run, information associated with one or more trace points is output, thereby generating a log of various paths through the source code and a log of which code sections of the source code were accessed as a result of running the instrumented code with input generated by the fuzzer. As discussed herein, each of components 402, 404, and 406 may be software-based sets of instructions.

Path coverage component 402 may be configured to insert one or more commands into the source code of a tested program to enable data input tracking, as discussed above, which allows the dynamic analysis program to determine input data capable of crossing one or more barriers within the source code. Path coverage component 402 may parse the source code and use one or more language processing algorithms to identify all source-level consecutive code sections in the source code of the tested program. In some embodiments, the path coverage component 402 may identify all consecutive code sections and insert commands to trace passage through these code section.

In some embodiments, the path coverage component 402 identifies potential barriers in the source code. As described above, a potential barrier may be a conditional expression that may prevent the program from executing a consecutive code section. Exemplary potential barriers may be an "if" condition, "else if" condition, a termination condition of a "for" loop, a "while" condition, a "switch" case, and the like.

In some embodiments, static analysis program 402 may expand single-line conditions such that each separate code section is encapsulated as a separate block. For example, the condition "if (<condition>) for (<loop conditions>)<single command>;" may expanded as:
  if (<condition>)
  {
    <module identifier>_ScoperAccumulateCounter(<n>);
    for (<loop conditions>)
    {
      <module identifier>_ScoperAccumulateCounter(<n+1>);
      <single command>;
    }
  }

In the above example, output commands (e.g., <module identifier>) are inserted following each potential barrier, the potential barriers in this example being "if(<conditions>)" and "for(<loop conditions>)." As used herein, the term "condition" refers to a condition or logical argument required to cross the potential barrier.

In other embodiments, conditional clauses separated by "&&" are also modified so the dynamic analysis program can identify which internal clause is a barrier. For example, "if (<condition 1>&& <condition 2>&& <condition 3>)" may become:
  if (<condition 1>&&
    <module identifier>_ScoperAccumulateCounter(<n>)
    &&
    <condition 2>&&
    <module identifier>_ScoperAccumulateCounter(<n+1>)
    &&
    <condition 3>)

This expansion enables the instrumentation tool to identify which condition is failing and therefore which input must be modified to result in a condition having a value of True and allow the program to execute the code section following the if-statement.

In some embodiments, the path coverage component 402 records one or more of the identified potential barriers, for example, in a database. Path coverage component 402 may record locations of potential barriers in a database, e.g., analysis database 208).

The raw-input variable component 404 may identify intrinsic "c" commands that input data from external sources (e.g., "read", "fread", "scanf", etc.), and may identify the variable into which the data is entered. Raw-input variable component 404 may then record these variables as raw-input variables, for example, in a database (e.g., analysis database 208). As will be discussed below with reference to FIG. 5, the dynamic analysis program 500 may determine how the data from these variables is assigned to other variables, thereby performing source level input tracing. In some embodiments, variables that can be connected back to raw-input variables are saved in an input-fields archive, in the analysis database 208, or in a separate storage.

The wrapping component 406 may be configured to instrument "wrapper" code to APIs and tested-program functions. Wrappers may be saved as ".txt" files in a specific folder, either in analysis database 208 or in a separate storage. Each wrapper may identify the source code function to be wrapped, and may specify special processing options that may be activated based on the contents of a special header that is inserted at the beginning of the input data file (for the tested program). Both the dynamic analysis program and the fuzzer program may change the values in this header, thereby activating or deactivating "external" events. In some embodiments, in addition to a default set of predefined wrappers, a user of the instrumentation tool may add new wrappers or modify existing wrappers to match the input required by the specific program being tested.

Figure 5:
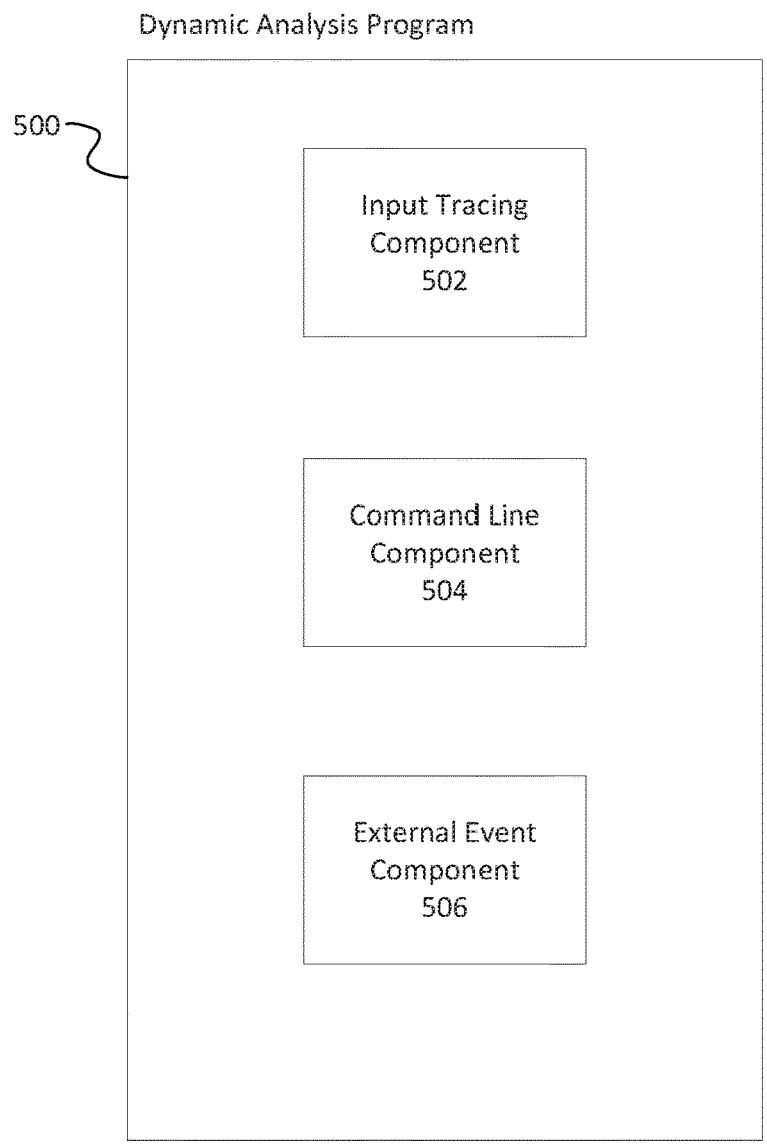
FIG. 5 is a block diagram depicting the components of a dynamic analysis program in accordance with disclosed embodiments.

FIG. 5 is a block diagram of an exemplary dynamic analysis program 500 comprising input tracing component 502, command line component 504, and external events component 506. Dynamic analysis program 500 may receive output generated by running the instrumented code generated by static analysis program 400 with input data generated by a fuzzer, and may communicate with the fuzzer to determine input values to satisfy one or more actual barriers. As used herein, an actual barrier occurs when, during a single run of the tested program, the from-point of a potential barrier was executed, but the to-point of the same potential barrier has not been executed. For example, while the fuzzer executes the tested program, trace information is collected. At the end of the run, if any new trace points were encountered in that run, the trace information is written to a path coverage output file, e.g., full-trace files 306. In some embodiments, when a new trace point is identified in a run, the system may save an input data file associated with the run that contains the data that was input to the tested program. The trace files and corresponding input data files may be analyzed by the dynamic analysis program 500, thereby generating a unified mapping of all points that were passed though in the source code. Based on the unified mapping, the dynamic analysis program 500 may identify actual barriers and may identify a percentage of the source code that was accessed.

Input tracing component 502 may use the output trace information to connect variables of barrier conditions with specific input locations in the source code. Based on this connection, input tracing component 502 may solve any identified actual barriers. For example, input tracing component 502 may determine values for the input variables (i.e., the variable that appear in one or more barrier conditions) that will satisfy each identified barrier condition. In some embodiments, input tracing component 502 may translate the determined values into corresponding values in the input data. For example, input tracing component 502 may identify a variable at the from-point of an actual barrier. Input tracing component 502 may then trace said variable through the source code to identify the location at which the variable is assigned an initial value. Input tracing component 502 may determine an initial value to pass to the variable such that the eventual from-point and to-points of the barrier are satisfied.

Command line component 504 may dynamically modify input data to one or more command line modifiers present in the source code of the tested program. For example, stand-alone console applications may have a large number of command line modifiers that affect their execution. Thus, it may not be practical to provide initial input-data samples to cover all the relevant combinations of command line arguments and their parameters. A bug or an exploitable vulnerability code may be accessible only with a specific combination of these arguments.

For example, the fuzzer may identify a crash that occurs only with a specific arrangement of command line arguments. The crash may not appear when each command line argument is executed independently. Thus, certain combinations of command line arguments may result in actual barriers in the source code.

Command line component 504 may receive a table of all possible command line arguments. In some embodiments, the table may be prepared prior to executing the tested program with the fuzzer, e.g., by static analysis program 400. In some embodiments, the table may include each argument's associated parameters, the parameter types, and the parameter default values. Command line component 504 may then generate a synthetic header and attach said header to the input data file with fields configured to cause the activation of various command line arguments with specified parameter values.

In some embodiments, the command line arguments may be replaced by static analysis program 400. For example, "argc" and "argv" parameters defined in the "main( )" header of the source code of a tested program may be replaced by static analysis program 400. Depending on the programming language, other parameters or headers may similarly be replaced. In some embodiments, the first command in the main( ) function is set to be a call to an instrumentation function that analyzes the synthetic input data file header and generates required command line settings, which are then stored as the "argc" and "argv" variables. In another embodiment, the static analysis program 400 may write the input data from the synthetic header into a new file and enter the file path in one or more of the command line arguments, as described above with reference to FIG. 4.

External events component 506 may determine input data to activate an external event in a synthetic header. In some embodiments, a synthetic header, generated by static analysis program 400, may contain data that determines if and when to activate an external event. For example, certain code sections may not activate, and therefore not be tested by a fuzzer, unless various failures due to external events occur (e.g., failed memory allocations, failed open/read/write 10 commands etc.). The wrapper code generated by static analysis program 400 may activate the dynamic analysis program 500 to determine if an event should happen. Thus, both the dynamic analysis program 500 and the fuzzer may change the values in the synthetic header and thereby activating or deactivating "external" events.

External events component 506 may also emulate external inputs (e.g., network communications). For example, some mechanisms cannot be checked in the testing environment (e.g. fuzzing a kernel-mode driver). However, it is possible to emulate such activities by wrapping the relevant APIs, e.g., using the wrappers generated by static analysis program 400.

In some embodiments, a part of the synthetic header holds data that determines if and when to activate these external events. The wrapper code inserted by static analysis program 400 may activate external events component 506 to determine if the external event should happen. The data to be transferred as part of these API calls may also be defined and stored in the header. Thus, both the dynamic analysis program 500 and the fuzzer may change the values in this header, thereby activating or deactivating "external" events. In some embodiments, external events component 506 may create and process additional input files that the tested program "consumes." The data of these "secondary" input files may be saved as part of the synthetic header, which allows the fuzzer to "fuzz" this secondary input data.

Using the above techniques, the dynamic analysis program 500 may aid the fuzzer in generating input data capable of crossing one or more actual barriers. The barrier crossing data generated by dynamic analysis program 500 may enable the fuzzer to access various paths in the source code faster than if the fuzzer alone were generating random input data.

An example of instrumented source code is as follows:
<code> parse_ScoperAccumulateCounter(272); //from-point
if (<code> parse_ScoperLogging && <source code> parse_ScoperLogging PointIsActive)
  if ((<condition> parse_ScoperLoggingPointIsActive) (287))
  {
    (<code> parse_ScoperLogging)(287, (long)((fr→lay)),
(long)(0));
  }
switch (fr→lay)
{
  case 1:
  {

```
<code> parse_ScoperAccumulateCounter(273); //to-
       point
```
In the above example, "switch (fr→lay) . . . case 1:" is the original source code. The additional code is instrumentation code inserted by the static analysis program.

An execution of above instrumented code may generate the following output:

[W=36] Barrier="libmpg123" "parse.c" "decode_header" 258→259 "if(fr→freeformat)"

[W=6] Barrier="libmpg123" "parse.c" "decode_header" 272→273 "switch(fr→lay)<case 1:>"

[W=7] Barrier="libmpg123" "parse.c" "decode_header" 272→276 "switch(fr→lay)<case 2:>"

This output identifies a barrier for the source code "switch (fr→lay)<case 1:>." The full-trace output of the exemplary instrumented code may result in the information contained in Table 1 below.

of the raw-input value to identify these locations, i.e., to identify the offsets in the input data. From the source code, the barrier condition requires that fr→lay=1. Using the function identified in Table 1:

fr→lay=1=4−4−(((newhead)&0x00060000)>>17);

Solving the above expression yields newhead=0x00060000 (2 relevant bits=3=11b). Analysis also identifies bits in the newhead DWORD that should not be modified: Bits2Ignore=0xFFF9FFFF.

Input field #20 (newhead) is assigned a value, which is the reverse order of the input bytes:

newhead=0x00060000=(hbuf[0]<<24)|(hbuf[1]<<16)| (hbuf[2]<<8)|hbuf[3];

This value of input field #20 may be traced to input field #35. Thus, the data written to the generated input file to cross the barrier "switch(fr→lay)<case 1:>" is Data2Output=0x00000600, Bits2Ignore=0xFFFFF9FF. By

TABLE 1

| # | Name | Function | Derived From | Derivation Function | Derivation Type |
|---|------|----------|--------------|---------------------|-----------------|
| 35 | fr->lay | decode_header | 34 | fr->lay = 4 - (((newhead)&0x00060000) >> 17); | Assignment |
| 34 | newhead | decode_header | 21 | decode_header(fr, newhead, &freeformat_count) | Call Down |
| 21 | newhead | INT123_read_frame | 20 | fr->rd->head_read(fr,&newhead) | Call Up |
| 20 (e) | newhead | generic_head_read | 9 | *newhead = ((unsigned long) hbuf[0] << 24) \| ((unsigned long) hbuf[1] << 16) \| ((unsigned long) hbuf[2] << 8) \| (unsigned long) hbuf[3]; | Assignment |
| 9 | hbuf | generic_head_read | 8 | fr->rd->fullread(fr,hbuf,4) | Call Up |
| 8 | buf | plain_fullread | 7 | fr->rdat.fdread(fr,buf+cnt,count-cnt) | Call Up |
| 7 | buf | plain_read | 6 | io_read(&fr->rdat, buf, count) | Call Up |
| 6 | buf | io_read | 4 | rdat->read(rdat->filept, buf, count) | Call Up |
| 4 | buf | posix_read | — | read(fd, buf, count) | RAW input |

As shown in Table 1, input field #35 is the variable fr→lay used in the function "decode-Header." Input field 35 is the input field that appears in the barrier condition "switch (fr→lay)<case 1:>". Table 1 indicates that input field 35 is computed from Input Field #34, "newhead" in function "decode-Header" by the command: "fr→lay=4−(((newhead) &0x00060000)>>17);"

The output of the trace point commands inserted by the static analysis program may be used to track input field #34 back to input field #20, "newhead" in function "generic_head_read", via parameter passing mechanisms. Following the full-trace information, the assignment command into input field #20 in function "generic_head_read," is the location at which raw input data, which was initially read into "buf" by the read command in the "posix_read" function (input field #8), is converted into a numerical value.

In this example, assume input tracing component 502 of the dynamic analysis program has found that this assignment command can extract data from the following offsets in the input-data: 0, 4096, 4722, 5348, 5975, 6602, etc. These offsets may be identified based on the output generated by commands inserted by raw-input variable component 404. For example, the dynamic analysis program may be configured to compare the debug log of one or more run-time "raw-input" values just before each value is assigned to a computational input-field with the actual current input-data using the above analysis, dynamic analysis program may determine the original input value that, after being manipulated by one or more functions in the source code, will satisfy the barrier condition of "switch(fr→lay)<case 1:>".

From the full-trace information generated when the instrumented code is executed with input from the fuzzer, the dynamic analysis program may determine that input field #20 is read from the input file (e.g., an input data file) at a number of offset locations: 0, 4096, 4722, 5348, etc. By inserting the values Data2Output=0x00000600, Bits2Ignore=0xFFFFF9FF at each of the determined input file locations, the dynamic analysis program may determine which input location enables the tested program to cross the barrier "switch(fr→lay)<case 1:>" when executed with the fuzzer.

In some embodiments, the dynamic analysis program may execute the tested software one or more times to determine which offset location enables the tested software to cross the barrier "switch(fr→lay)<case 1:>." For example, the dynamic analysis program may generate a number of modified input files, each file having one of the offsets updated with the Data2Output. The dynamic analysis program may execute the tested program with each of the modified input files and, following each execution, check the generated path coverage to see if the tested program reached the "to-point" of the barrier, i.e., to-point 273.

Based on performing the above analysis, the dynamic analysis program may determine that inserting the value of Data2Output at the offset location 4096 enables the tested program to cross the "switch(fr→lay)<case 1:>" barrier. Thus, the dynamic analysis program generates a modified input data file replacing the value of OriginalData at the offset location with the value of ActualData2Output. The output resulting from executing the tested program with the modified input data is "New Points! libmpg123-parse.c: 273, 274, 275," indicating that to-point 273 of the barrier "switch(fr→lay)<case 1:>" was successfully reached by the new input data.

In another example, the dynamic analysis program may target a barrier: [W=12] Barrier="libmpg123" "parse.c" "skip_junk" 400→401 "if(newhead==('R'<<24)+('I'<<16)+('F'<<8)+'F')"

The instrumented source code associated with the barrier "if(newhead==('R'<<24)+('I'<<16)+('F'<<8)+'F')" is:

<code> parse_ScoperAccumulateCounter(400); //from-point
if (newhead==('R'<<24)+('I'<<16)+('F'<<8)+'F')
{
<code> parse_ScoperAccumulateCounter(401); //to-point Full-trace information, shown in Table 2, is generated as a result of executing the instrumented code with the fuzzer. can extract data from the following offsets in the input-data: 0, 4096, 4722, 5348, 5975, 6602, etc.

The dynamic analysis program may solve the barrier condition by evaluating: newhead==('R'<<24)+('I'<<16)+('F'<<8)+'F'

Solving the barrier condition yields "newhead=0x52494646." The dynamic analysis module may also analyze the full trace information to identify the order of execution of the source code and thus determine the procedural calling sequence associated with the variable "newhead." The dynamic analysis program may also determine, based on full trace information, that all bits in the newhead DWORD should be modified. The way in which data is mapped to the input file is shown in #20 of Table 2:

newhead=0x52494646=(hbuf[0]24)|(hbuf[1]<<16)|(hbuf[2]<<8) hbuf[3];

(Reversing the Order of the Bytes)

Thus, the dynamic analysis program may determine, based on analysis of input-field #20, that the data to be written to the input file is Data2Output=0x46464952 with Bits2Ignore=0x00000000.

From the full-trace information generated when the instrumented code is executed with input from the fuzzer, the dynamic analysis program may determine that input field #20 is read from the input file (e.g., an input data file) at a number of offset locations: 0, 4096, 4722, 5348, etc. By

TABLE 2

| # | Name | Function | Derived From | Derivation Function | Derivation Type |
|---|------|----------|--------------|--------------------|-----------------|
| 24 | newhead | skip_junk | 23 | unsigned long newhead = *newheadp; | Assignment |
| 23 | newheadp | skip_junk | 21 | skip_junk(fr, &newhead, &headcount) | Call Down |
| 21 | newhead | INT123_read_frame | 20 | fr->rd->head_read(fr,&newhead) | Call Up |
| 20 (*) | newhead | generic_head_read | 9 | *newhead = ((unsigned long) hbuf[0] << 24) \| ((unsigned long) hbuf[1] << 16) \| ((unsigned long) hbuf[2] << 8) \| (unsigned long) hbuf[3]; | Assignment |
| 9 | hbuf | generic_head_read | 8 | fr->rd->fullread(fr,hbuf,4) | Call Up |
| 8 | buf | plain_fullread | 7 | fr->rdat.fdread(fr,buf+cnt,count-cnt) | Call Up |
| 7 | buf | plain_read | 6 | io_read(&fr->rdat, buf, count) | Call Up |
| 6 | buf | io_read | 4 | rdat->read(rdat->filept, buf, count) | Call Up |
| 4 | buf | posix_read | — | read(fd, buf, count) | RAW input |

From the full input tracing information, the dynamic analysis program may analyze the trace information to determine that input field #24 is the input field that appears in the barrier condition "if(newhead==('R'<<24)+('I'<<16)+('F'<<8)+'F')". Following the trace information in Table 2, input field #24 is derived from input field #23, "newheadp" in function "skip_junk", by the assignment command "unsigned long newhead=*newheadp;." Input field #23 may be traced back to input field #20, "newhead" in function "generic_head_read", via parameter passing mechanisms, which do not change the value of the parameter (e.g., "newhead") being passed. The assignment command into input field #20 in function "generic_head_read" is where raw input data that is initially read into "buf" by the read command in the "posix_read" function, is converted into a numerical value.

The dynamic analysis program may analyze this trace information and determine that the assignment command inserting the values Data2Output=0x46464952, Bits2Ignore=0x00000000 at each of the offset locations, the dynamic analysis program may determine which input location enables the tested program to cross the barrier location "if(newhead==('R'<<24)+('I'<<16)+('F'<<8)+'F')" when executed with the fuzzer.

By comparing the debug logging of the raw-input variables with the input data, as described above, the dynamic analysis program determines that the updated value should be inserted into the input data file at the offset location 0. Executing the tested program with the modified input data file having the value 0x46464952 at offset 0 yields the output trace information: "New Points! libmpg123-parse.c: 181, 301, 307, 320, 327, 388, 401, 402, 405, 407, 408, 409, 410, 411, 468, 469, 470" which includes the to-point 401 and indicates the barrier was successfully crossed.

Figure 6:
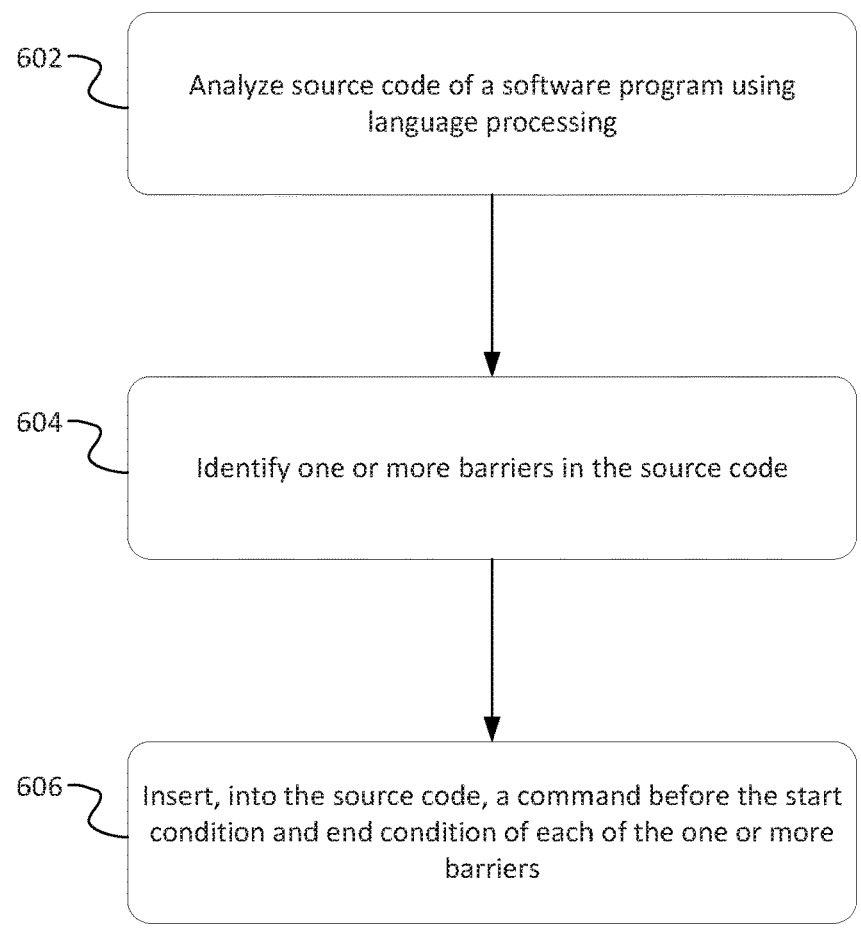
FIG. 6 is an example process flow diagram for inserting commands into source code being tested in accordance with disclosed embodiments.

FIG. 6 is a flowchart of an exemplary process 600 for performing static analysis of test program source code.

Process 600 may be executed by at least one processor and cause the at least one processor to perform operations for exposing potential vulnerabilities in software programs. At step 602, the processor may analyze source code of a software program using one or more language processing techniques. For example, the processor may execute static analysis program 202 to receive source code and parse the source code to identify one or more barrier conditions (step 604), as described above. At step 606, the processor may insert, into the source code, one or more commands before the start condition (e.g., from-point) and the end condition (e.g., to-point) of each of the one or more barriers. In some embodiments, the start and/or end condition may include one or more logically conjunct clauses. As previously described with reference to FIG. 2, the static analysis program 202 may also insert commands into the source code to output run-times for various code sections.

Figure 7:
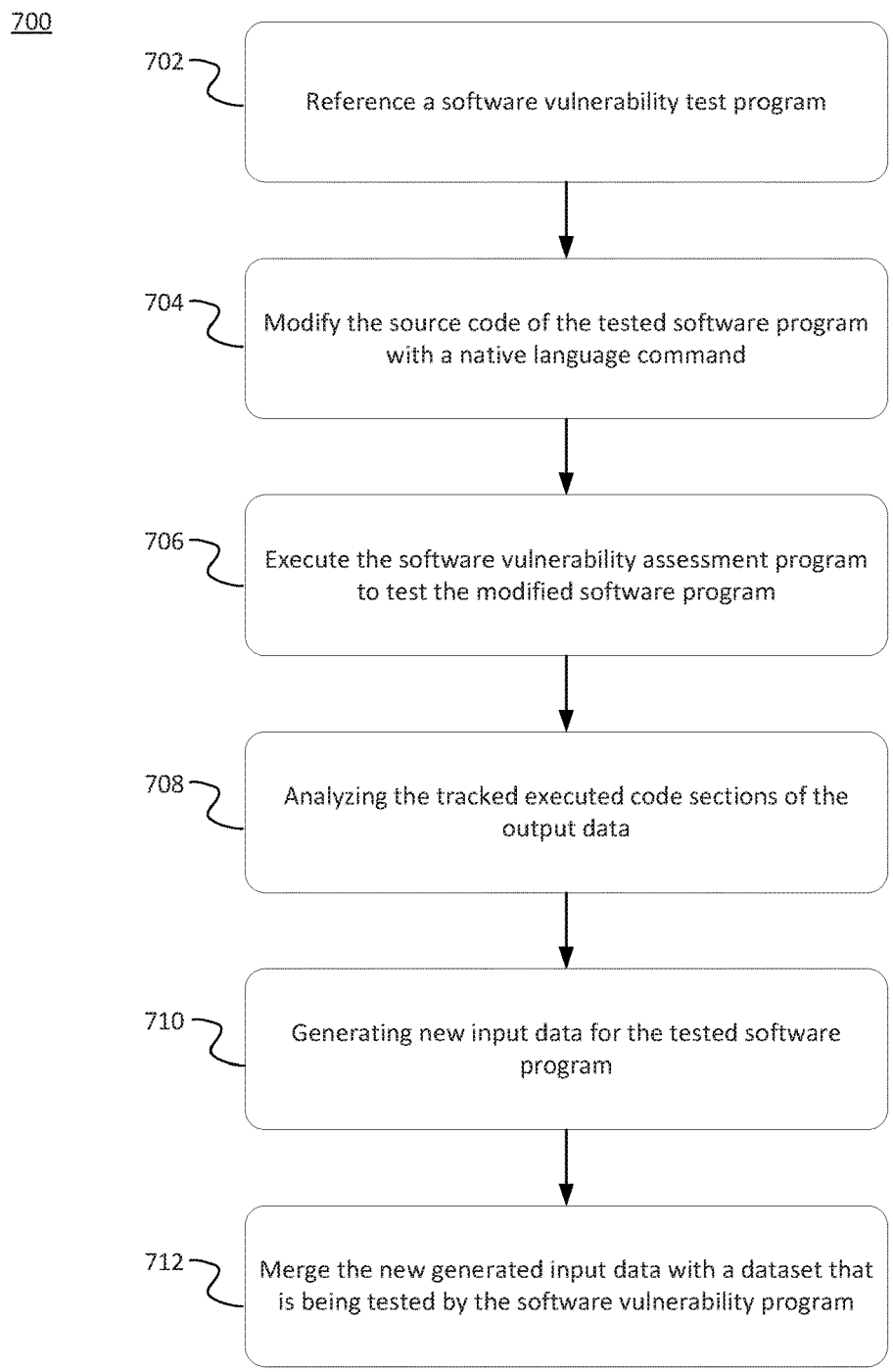
FIG. 7 is an example process flow diagram for exposing potential vulnerabilities in software programs in accordance with disclosed embodiments.

FIG. 7 is a flowchart of an exemplary process 700 for exposing potential vulnerabilities in software programs. Process 700 may be executed by at least one processor and cause the at least one processor to perform operations for exposing potential vulnerabilities in software programs. Process 700 may reference a software vulnerability program, also referred to herein as a fuzzer, configured to execute a tested software program and apply random or semi-random changes to input data for the tested software program (step 702). At step 704, the processor (e.g., by executing static analysis program 202) may modify the source code of the tested software program with a native language command in order to track executed code sections of the tested software program and generate output data with the tracked executed code sections. In some embodiments, the inserted commands do not change the functional behavior of the tested software program.

At step 706, the processor may execute the software vulnerability assessment program to test the modified software program. For example, a fuzzer 302 may execute the instrumented source code generated by static analysis program 202. The instrumented code may be executed, for example, with an initial data set (e.g., initial data 304) generated by the software vulnerability assessment program.

At step 708, the processor may analyze the tracked executed code sections of the output data, which were generated as a result of executing the full-trace commands in instrumented source code. For example, based on the analysis, the processor may identify one or more current barriers in the tested program, each current barrier indicating an executed code section of the tested software program and an unexecuted code section of the tested software program following the executed code section. For example, an executed code section may be the output statement at the from-point before a barrier condition. As unexecuted code statement may be, for example, the unexecuted output statement after the barrier condition, at a to-point.

At step 710, the processor (e.g., by executing dynamic analysis program 500), generates new input data for the tested software program configured to cross the one or more current barriers. For example, as discussed with reference to FIG. 5, the dynamic analysis program may generate input data by tracing and analyzing one or more variables of the barrier condition and/or by generating one or more synthetic headers, thereby allowing the fuzzer and/or dynamic analysis program to emulate external events.

At step 712, the processor may merge the newly generated input data with a dataset that is being tested by the software vulnerability assessment program. For example, dynamic analysis program 308 may merge the generated data with a dataset being tested by the software vulnerability program, e.g., fuzzer 302, and insert the merged input dataset into the fuzzer queue 314.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for exposing potential vulnerabilities in software programs, the operations comprising:
 referencing a software vulnerability assessment program configured to:
  execute a tested software program; and
  apply, via the execution, random changes to input data for the tested software program;
 modifying the source code of the tested software program with a native language command, without changing the functional behavior of the tested software program, in order to:
 track executed code sections of the tested software program; and
 generate output data with the tracked executed code sections;
 executing the software vulnerability assessment program to test the modified tested software program;
 analyzing the tracked executed code sections of the output data, generated during the execution of vulnerability assessment program, to identify one or more current barriers in the tested software program, wherein the one or more current barriers comprise an executed code section of the tested software program and an unexecuted code section of the tested software program;
 generating new input data for the tested software program configured to cross the one or more current barriers; and merging the new generated input data with a dataset that is being tested by the software vulnerability assessment program.

2. The non-transitory computer readable medium of claim 1, wherein generating the new input data comprises determining a set of values that satisfy the one or more current barriers to access the unexecuted code section.

3. The non-transitory computer readable medium of claim 2, wherein determining the set of values comprises at least one of:
  modifying the new input data to satisfy the one or more current barrier conditions;
  activating command line arguments in the tested software program;
  simulating external operating system events affecting the tested software program; or
  emulating external inputs to the tested software program.

4. The non-transitory computer readable medium of claim 2, wherein generating new input data further comprises determining an offset location for each value in the set of values, the offset location being associated with a position in a file containing the input data.

5. The non-transitory computer readable medium of claim 1, wherein the operations further comprise analyzing the source code of the tested software program to identify the one or more current barriers.

6. The non-transitory computer readable medium of claim 1, wherein the operations further comprise executing the tested software program such that the software vulnerability assessment program uses the merged new generated input data to access the previously unexecuted code section.

7. The non-transitory computer readable medium of claim 1, wherein the one or more current barriers have a barrier condition that comprises a programming language-specific condition statement.

8. The non-transitory computer readable medium of claim 1, wherein generating the new input data comprises generating one or more initial values, wherein an initial value is configured to satisfy the one or more current barriers after being acted upon by the source code of the tested software program.

9. A non-transitory computer readable medium including instructions that, when executed by at least one processor, cause the at least one processor to perform operations for exposing potential vulnerabilities in software programs, the operations comprising:
  analyzing source code of a tested software program using language processing;
  identifying one or more current barriers in the tested software program, each barrier having a start condition and an end condition; and inserting, into the source code, a command before the start condition and the end condition of each of the one or more barriers;
  where utilization of the barriers in configuring vulnerabilities test and corresponding input dataset includes:
  applying, via execution of the tested target program by a vulnerabilities assessment software, random changes to input data for the tested software program;
  modifying the source code of the tested software program with a native language command, without changing the functional behavior of the tested software program, in order to:
    track executed code sections of the tested software program; and
    generate output data with the tracked executed code sections;
  executing the software vulnerability assessment program to test the modified software program; and analyzing the tracked executed code sections of the output data, generated during the execution of vulnerability assessment program, to identify one or more current barriers in the tested software program,
  wherein the one or more current barriers comprise an executed code section of the tested software program and an unexecuted code section of the tested software program;
  generating new input data for the tested software program configured to cross the one or more current barriers; and merging the new generated data with the dataset that is being tested by the vulnerabilities assessment program.

10. The non-transitory computer readable medium of claim 9, wherein at least one of the start condition or the end condition comprises one or more logically conjunct clauses.

11. The non-transitory computer readable medium of claim 10, wherein the operations further comprise expanding the one or more logically conjunct clauses and inserting an execution tracking command associated with each clause.

12. The non-transitory computer readable medium of claim 9, wherein the operations further comprise identifying one or more variables of the source code.

13. The non-transitory computer readable medium of claim 12, wherein the one or more variables comprise a variable that is assigned a value received from an external source.

14. The non-transitory computer readable medium of claim 9, wherein the tested software program comprises one or more function wrappers.

15. The non-transitory computer readable medium of claim 14, wherein the operations further comprise:
  analyzing the one or more wrappers;
  identifying at least one header;
  inserting the wrapper code into the source code of the tested software program; and
  replacing all references to the wrapped function by reference to the wrapper function.

16. The non-transitory computer readable medium of claim 15, wherein the command is configured to conditionally provide input indicative of an external event based on inserted input data to the tested software program.

17. A computer-implemented method for exposing potential vulnerabilities in software programs, the method comprising:
  referencing a software vulnerability assessment program configured to:
    execute a tested software program; and
    apply, via the execution, random changes to input data for the tested software program;
  modifying the source code of the tested software program with a native language command, without changing the functional behavior of the tested software program, in order to:
  track executed code sections of the tested software program; and
  generate output data with the tracked executed code sections;
  executing the software vulnerability assessment program to test the modified software program;
  analyzing the tracked executed code sections of the output data, generated during the execution of vulnerability assessment program, to identify one or more current barriers in the tested software program, wherein the one or more current barriers comprise an executed code section of the tested software program and an unexecuted code section of the tested software program;

generating new input data for the tested software program configured to cross the one or more current barriers; and merging the new generated input data with a dataset that is being tested by the software vulnerability assessment program.

18. The computer-implemented method of claim 17, wherein generating the new input data comprises determining a set of values that satisfy the one or more current barriers to access the unexecuted code section.

19. The computer-implemented method of claim 18, wherein determining the set of values comprises at least one of: activating command line arguments in the tested software program, simulating external operating system events affecting the tested software program, or emulating external inputs to the tested software program.

20. The computer-implemented method of claim 17, further comprising analyzing the source code of the tested software program to identify the one or more current barriers.

* * * * *